United States Patent [19]

Halper et al.

[11] Patent Number: 4,737,538

[45] Date of Patent: * Apr. 12, 1988

[54] POLYMER CONCRETE COMPOSITIONS

[75] Inventors: Walter M. Halper; Carl L. Willis, both of Houston, Tex.

[73] Assignee: Shell Oil Company, Houston, Tex.

[*] Notice: The portion of the term of this patent subsequent to Jun. 3, 2003 has been disclaimed.

[21] Appl. No.: 782,748

[22] Filed: Sep. 30, 1985

[51] Int. Cl.$^4$ .............................. C08K 3/36; C08K 3/34
[52] U.S. Cl. ........................................ 524/505; 524/538
[58] Field of Search ................. 523/436, 522; 524/505

[56] References Cited

U.S. PATENT DOCUMENTS

| | | | |
|---|---|---|---|
| 3,231,634 | 1/1966 | Wismer et al. | 260/862 |
| 3,377,406 | 4/1968 | Newey et al. | 260/837 |
| 3,674,893 | 7/1972 | Nowak et al. | 260/836 |
| 3,773,709 | 11/1973 | Boutsicaris | 260/41.5 A |
| 3,857,812 | 12/1974 | Nowak et al. | 260/40 R |
| 3,882,078 | 5/1975 | Kubota | 260/40 R |
| 3,989,769 | 11/1976 | Bonnington | 260/873 |
| 3,992,479 | 11/1976 | Roberts | 260/862 |
| 3,998,909 | 12/1976 | Roberts et al. | 260/862 |
| 4,020,036 | 4/1977 | South, Jr. | 260/40 R |
| 4,096,107 | 6/1978 | Roberts et al. | 260/33.6 UA |
| 4,143,381 | 3/1979 | Roberts et al. | 260/880 R |
| 4,212,790 | 7/1980 | Ibata et al. | 523/521 |
| 4,308,358 | 12/1981 | Miller | 525/267 |
| 4,346,050 | 8/1982 | Trent et al. | 523/521 |
| 4,400,478 | 8/1983 | Gergen et al. | 523/514 |

OTHER PUBLICATIONS

Brydson; Plastics Materials; Newnes-Butterworths; 1975; Sci. Lib. TP 1120 B7; pp. 577, 578.

*Primary Examiner*—Lewis T. Jacobs
*Attorney, Agent, or Firm*—Peter A. Bielinski

[57] ABSTRACT

The invention relates to a room temperature atmosphere pressure polymer concrete moldable composition comprising a thermosetting resin, vinyl monomer, catalyst, filler and a particular rubber component.

13 Claims, No Drawings

POLYMER CONCRETE COMPOSITIONS

BACKGROUND OF THE INVENTION

1. Field of the Invention

The invention relates to a molding compound. More particularly, the invention relates to a molding compound comprising a thermosetting resin, vinyl monomer, catalyst, filler and a particular rubber component.

2. Description of the Prior Art

The use of polymeric materials in concrete formulations is well known. One common composite material is called polymer-impregnated concrete wherein hardened portland cement concrete is impregnated with a liquid monomeric material which is subsequently polymerized in situ. These materials have remarkable durability and resistance against salts and the like which make their use especially attractive for concrete pipe, desalting plants, tunnel support linings and bridge decks. Another system is a polymer-portland cement concrete which is produced by adding a monomeric or polymeric material to a fresh portland cement concrete mixture which is subsequently cured and polymerized after placement. It will be appreciated that both the above systems are hydraulic systems, i.e., they require the use of water to cure the portland cement. Accordingly, another system has more recently been discovered which is called polymer concrete which contains little or no cement and no water. This is a composite formed by polymerizing a monomeric material with aggregate (gravel, sand, etc.).

The resin most often employed in present polymer concrete compositions are the so-called acrylate resins, especially, methyl methacrylate. These acrylate resins are relatively inexpensive; however, they suffer a multitude of serious shortcomings. For example, they exhibit high volatility, high toxicity, high flammability, and are explosive. More importantly, they exhibit high shrinkage which severely limits their useful life in some applications.

A number of these serious environmental shortcomings (toxicity, volatility, etc.) were eliminated by the replacement of the methacrylate resins with polyester resins in combination with an aggregate.

Compositions have been discovered which exhibit increased and improved physical and chemical properties, especially reduced shrinkage fter cure which incorporate polyesters and fillers containing fly ash. These compositions had problem with shrinkage and surface appearance.

Unsaturated polyester resins, that is, copolymerizable mixtures of (1) a polyester of an alpha, beta-ethylenically unsaturated dicarboxylic acid, optionally a saturated dicarboxylic acid, and a dihydric alcohol, and (2) an ethylenically unsaturated monomer capable of crosslinking the polyester molecules at the points of unsaturation, are extensively utilized commercially as sheet molding resins. These resins can be utilized in the production of a wide variety of shaped articles such as boats, automobile bodies, heater housings, containers of various types, toys, awnings, business machine bodies, electrical housings and the like. One particular advantage obtained by the use of unsaturated polyester resins in molding operations is the fact that little and sometimes no pressure need be used. Low pressure molding is possible because no condensation by-products that must be removed are formed during the curing of such resins.

The production and use of sheet molding compounds (SMC) is well known. Various formulations are disclosed in the following U.S. Pat. Nos.: 3,231,634; 3,674,893; 3,773,709; 3,857,812; 3,882,078; 3,989,769; 3,992,479; 3,998,909; 4,020,036; 4,096,107; 4,145,381 and 4,400,478. A typical SMC formulation contains an unsaturated polyester resin, styrene monomer, rubber, peroxide catalyst, surface agent (e.g. zinc stearate), filler (e.g. calcium carbonate), thickening agent (e.g. magnesium oxide), glass fibers and pigments.

The composition disclosed in the sheet molding compound prior art contain a thickening agent, e.g., MgOH or MgO and a rubber component to enhance physical properties and reduce shrinkage.

These SMC compounds are designed so that thickening takes place very slowly, e.g., several days, and so that they may be molded 7 to 14 days after mixing. SMC materials are compression molded and always use high pressures up to 2000 psi to fill the mold and during curing.

In the past other thermoplastic polymer modifiers used in the systems phase separated when exposed to the high temperature high pressure curing conditions. Shrink control was attributed to this phase separation in these systems.

Molding or curing temperatures range between 100° C. and 200° C.

What was desired was a polymer concrete composition which could be mixed, molded and cured at atmospheric pressure and ambient temperature in less than 1 to 2 hours and which would have good physical properties, good surface appearance and little or no shrinkage.

SUMMARY OF THE INVENTION

The present invention relates to a room temperature low pressure curing moldable polymer concrete composition having improved mechanical properties and dimensional stability when molded, said compsoition comprising:
  (a) an unsaturated, crosslinkable thermosetting resin;
  (b) an ethylenically unsaturated monomer;
  (c) an additive selected from the group consisting of reinforcing agents, fillers and mixtures thereof;
  (d) a low temperature free radical initiator;
  (e) a low temperature promotor; and
  (f) styrene-diene block copolymer.

These compositions are especially suitable for use in making pipe, bridge decks, dam spillways, building panels, tank linings and the like. Articles of construction prepared from these novel compositions exhibit lower cost, excellent chemical resistance and physical properties, such as high strength and relatively low shrinkage. Some systems may even exhibit expansion.

DETAILED DESCRIPTION OF THE INVENTION

Polymer Modifier

A key aspect of the present invention is the polymer modifier. In the case of a styrene butadiene polymer an aspect of the polymer is the microstructure of the butadiene portion. This microstructure, as determined by an infra-red (IR) method of analysis, is as follows (expressed in mol percent):

|  | Preferred | More Preferred |
| --- | --- | --- |
| 1,2-vinyl | 10 to 90 | 35–70 |
| 1,4-cis | 5 to 40 | 15–25 |
| 1,4-trans | 5 to 50 | 15–40 |

The desired weight average molecular weights of the styrene portion and butadiene portion of each block copolymer arm are:

|  | Preferred | More Preferred |
| --- | --- | --- |
| Styrene block | 1,000 to 100,000 | 11,000 to 15,000 |
| Butadiene block | 30,000 to 100,000 | 60,000 to 80,000 |

The styrene-diene polymer is typically prepared by anionic polymerization employing an organomonolithium initiator. The first step of the process involves contacting the styrene monomer and the organomonolithium compound (initiator) in the presence of an inert diluent therein forming a living polymer compound having the simplified structure S-Li. The inert diluent may be an aromatic or naphthenic hydrocarbon, e.g., benzene or cyclohexene, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the styrene monomer in step one are represented by the formula RLi; wherein R is an aliphatic cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyllithium, and the like. The lkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-60°$ to $+300°$ F. and at pressures which are sufficient to maintain the reaction mixture in the liquid phase.

Next, the living polymer in solution is contacted with a diene monomer. The resulting living polymer has a simplified structure styrene-diene-lithium, or P-Li as used to define the polymer composition.

The medium vinyl polybutadiene block is readily obtained by employing a small amount of a polar material as a vinyl promotor. The vinyl promotor conveniently is added to the hydrocarbon diluent at the appropriate time in the polymerization sequence. These promotors can be selected from ethers, tertiary amines, and other promoters. Exemplary species include the presently preferred dimethoxybenzene, as well as tetrahydrofuran, 1,2-dimethoxyethane, dimethyl ether, diethyl ether, methyl ethyl ether, ethyl propyl ether, di-n-propyl ether, di-n-octyl ether, anisole, dibenzyl ether, diphenyl ether, dimethylethylamine, tri-n-propylamine, tri-n-butylamine, trimethylamine, triethylamine, N,N-dimethylaniline, N-ethylpiperidine, N-methyl-N-ethylaniline, N-methyl-morpholine, N,N,N',N'-tetramethylethylenediamine, and the like. The amount of polar compound employed will vary widely with the choice of vinyl promoter, but should be that amount necessary to promote the degree of vinylization desired. An exemplary amount would be in the range of about 0.01 to 25 parts by weight per hundred parts monomer. See generally U.S. Pat. No. 4,308,358.

The microstructure of the polybutadiene block of the AB block copolymer may be determined by conventional infra-red analysis, using the 910 cm$^{-1}$ band. The average molecular weights of the polystyrene blocks of the block copolymer are determined by gel permeation chromotography, whereas the polystyrene content of the polymer is measured by infra-red spectroscopy of the finished polymer.

The living polymer may be coupled with a variety of coupling agents e.g. $CO_2$ which are well known in the art.

Next the polymer is recovered by known finishing techniques.

Thermosetting Resins

The unsaturated, crosslinkable thermosetting resins include both unsaturated vinyl ester resins and unsaturated polyester resins. The vinyl ester resins are typically prepared by the esterification of polyepoxides with ethylenically unsaturated monocarboxylic acids in the presence of onium salts of inorganic acids, such as disclosed in U.S. Pat. No. 3,377,406, which is herein incorporated by reference. The vinyl ester resins have a typical formula:

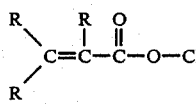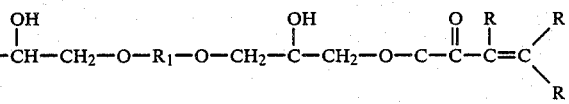

and are prepared by reacting a glycidyl polyether of a polyhydric phenol with an acrylic acid in the presence of an onium salt.

The composition of the polymerizable unsaturated polyester resin component of the molding compositions of this invention may be varied widely. The polymerizable unsaturated polyester portion thereof is ordinarily prepared by the reaction of an alpha, beta-ethylenically unsaturated dicarboxylic acid, or an admixture of such an acid with a saturated dicarboxylic acid, and a dihydric alcohol. Among the ethylenically unsaturated dicarboxylic acids which may be used are maleic acid, fumaric acid, mesaconic acid, aconitic acid, citraconic acid, ethyl maleic acid, xeronic acid, itaconic acid, and the like. Halogen substituted derivatives of these acids may also be utilized. The anhydrides of these acids, where the anhydrides exist, are, of course, embraced under the term "acid" since the reaction products or polyesters obtained by utilizing such acids and anhydrides are the same, and, in fact, in many instances it is preferred to utilize the anhydride rather than the free acid.

The dihydric alcohol component of the polyester includes such compounds as ethylene glycol, diethylene glycol, triethylene glycol, polyethylene glycol, 1,3-propanediol, 1,2-propanediol, di-1,3-propanediol, butylene glycol, halogen substituted glycols, and the like. Small amounts of polyols with a functionality greater than two may be utilized in conjunction with the dihydric component.

As indicated hereinabove, in many instances it is desirable to utilize a portion of a saturated dicarboxylic acid in conjunction with the ethylenically unsaturated dicarboxylic acid component. Examples of useful saturated acids include phthalic acid, isophthalic acid, terephthalic acid, succinic acid, adipic acid, suberic acid, azelaic acid, sebacic acid, dimethyl succinic acid, as well as halogenated derivatives of the above acids, and the like.

The inclusion of a saturated dicarboxylic acid, such as described hereinabove, in an unsaturated polyester resin does not alter the beneficial effects realized from the addition of a small quantity of the carboxy-containing polymer. Generally, a saturated dicarboxylic acid is included as one of the components utilized in the preparation of an unsaturated polyester resin as some physical properties are improved by such inclusion. The term "unsaturated polyester resin" as used in the resin industry is interpreted as a resin utilizing an unsaturated dicarboxylic acid as at least a portion of the acid component of the polyester; therefore, the term embraces those resins which also utilize a saturated dicarboxylic acid as a portion of the acid component.

The cross-linkable polyester resins and vinyl ester resins obtained by the various procedures set forth in the patents listed above can be readily cross-linked by uniting them with ethylenically unsaturated monomers, i.e., monomeric compounds containing a $CH_2=C<$ group. Styrene and vinyl toluene are most frequently utilized as the cross-linking monomer, although many other monomers may also be employed. Styrene is the most preferred monomer. Such other monomers include divinyl benzene, ethyl alpha-methyl styrene, chloro- and fluoro-styrenes, diallyl phthalate, triallyl cyanurate, allyl diglycolate, diallyl phenyl phosphonate, diethylene glycol bis(allyl carbonate), 1,2-propylene glycol bis(allyl carbonate), bis(allyl lactate)carbonate, allyl succinyl sllyl glycolate, allyl maleate, methallyl maleate, alkyl acrylates such as methyl acrylate, ethyl acrylate, propyl acrylate and butyl acrylate, vinyl acetate, allyl acetate, and the like. In addition to the foregoing monomeric compounds, which are merely representative, any

group containing monomer or mixtures of such monomers may be utilized if desired.

Other thermosetting resins which may be used in the blends of the present invention include epoxy resins, acetylene terminated polyamides, polyimides and polyamide-imides.

Free Radical Initiator

The catalysts used in this invention are conventional free radical polymerization initiators selected from among organic peroxides and the hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. In addition, azo compounds such as azobis isobutyronitrile can be employed. A presently preferred catalyst is t-butyl perbenzoate. The catalyst should function in the 0° C. to 60° C. temperature range.

A low temperature catalyst may be used as a combination of a catalyst and a low temperature promoter such as a transition metal salt or metal complex such as cobalt naphthanate, so that the initiator will function at 0° C. to 60° C. or at ambient temperatures.

Filler

As noted hereinbefore, an essential component in the present composition is an inorganic filler.

In general, the sand or gravel which is preferred in the present composition is derived from the crushing of rock and the like. In other words, the sand or gravel has been obtained as a fractured product and exhibits an irregular and somewhat sharp feel. This sand or gravel is required is required in conventional hydraulic concretes and mortars to impart the necessary structural strength.

In general, the sand which is suitable in the present compositions is a relatively dense silica material having a particle size from about 1 inch to about 100 mesh, with from about 5 to about 40 mesh being preferred.

The filler may include fly ash, crushed stone, expanded mica and other silica and inorganic materials; expanded polymers; metal fibers, staples, bars and/or mesh; glass fibers or mats; etc.

Also, for producing lightweight and insulating materials, up to about 25% of the filler, may be replaced with an insulating material such as expanded mica and the like.

Of course, other materials may be mixed or added, including, plasticizers, stabilizers, extenders, oils, resins, tars, asphalts, pigments, reinforcing agents, thioxotropic agents, mold release agents and the like.

The compositions of the present invention are simply made by mixing the components together, placing the blend into a suitable mold or form and allowed to cure or harden. In general, the polymerization temperature will vary from about 0° C. to about 100° C. and more preferably from about 10° C. to about 60° C. or from 15° to 40° C.

The instant process and compositions may be utilized in the preparation of a wide variety of articles, especially articles of construction such as pipes, pipe linings, building panels, armor plating, dam and spillway overlays, etc.

The relative amounts of each component are readily determined and adjusted by one skilled in the art. Relative amounts of various components are expressed below in percent by weight:

|  | Preferred Range | Typical Formulation |
|---|---|---|
| unsaturated thermosetting resin | 2 to 30% | 10 |
| ethylenically unsaturated monomer | 2 to 30% | 10 |
| filler | 40 to 96 | 75 |
| styrene-diene polymer | .1 to 30 | 5 |
| mold release agent | .1 to 2 | >1 |

|  | Preferred Range | Typical Formulation |
|---|---|---|
| initiator | .01 to 1 | >1 |

The invention is further illustrated by means of the following illustrative embodiments, which are given for the purpose of illustration only and are not meant to limit the invention to the particular reactants and amounts disclosed.

EXAMPLES

| Resin 1 | cyclopentadiene modified isophthalic acid polyester #32-779 | available from Reichold Chemical Company |
|---|---|---|
| Resin 2 | isophthalic acid polyester #92-888 available from Reichold | available from Reichold Chemical Company |
| Resin 3 | orthophthalic anhydride polyester #92-867 | available from Reichold Chemical Company |
| Resin 4 | vinyl ester #921 | available from Ashland Chemical Company |
| Resin 5 | propylene glycol maleic anhydride polyester #3702-5 | available from Koppers Chemical Company |

The polymer modifiers used are based on alkyl lithium-prepared styrene-butadiene (S-B), styrene isoprene (S-I) or styrene ethylene butylene (S-EB) block copolymers.

| Rubber | Type | Styrene MW | Rubber MW |
|---|---|---|---|
| 1 | S-B-S | 12,000 | 66,000 |
| 2 | S-B-S | 10,000 | 72,000 |
| 3 | S-I-S | 10,000 | 115,000 |
| 4 | S-EB-S | 7,000 | 40,000 |
| 5 | S-B | 30,000 | 132,000 |
| 6 | S-B | Tapered Diblock | |
| 7 | S-B | Tapered Diblock | |

Molecular weights are determined by GPC.

The thermosetting resins were used as 60% solids solutions in styrene as obtained from the suppliers. The block copolymer polymer modifiers were used as 25% solids solutions in styrene.

The basic formulation for the polymer concrete samples was:

| Resin/Rubber | 60 parts |
|---|---|
| Fly Ash | 40 parts |
| Catalyst | 2 parts based on the rubber-resin mixture |

All of the resins were prepromoted with cobalt naphthate at a level of 0.2 parts/100 resin. The formulation to make the test molding was:

|  | Weight | Parts Liquid | Parts Total |
|---|---|---|---|
| Resin | 400 gms | 80 | 60 |
| Rubber Solution | 100 gms | 20 | |
| Fly Ash | 333 gms | — | 40 |
| Catalyst | 10 gms | 2 based on liquids | |

The resin and rubber solutions were mixed together with a small paddle mixer. The catalyst was added to this blend. Then the fly ash was added and mixed until a smooth mixture was obtained. In approximately two to three minutes the mixture was poured into the molds and left to cure at room temperature. The samples after curing were labelled and the compressive testing was done at least 24 hours later.

The catalyst used in the examples was Lupersol DDM-9 methyl ethyl ketone peroxide available from Penwalt Corp. #129.

The compositions for the examples were run at 40% filler in order to amplify the effects of the rubber on the shrinkage. In typical applications, however, the filler concentration may be considerably higher.

Two $3''\times 18''\times \frac{3}{8}''$ and $3''\times 18''\times \frac{1}{2}''$ panels were made for examining the shrinkage of the polymer concrete formulation. The above panels were cast on 20 mil aluminum plate that was coated with an epoxy (Atlas 828) to insure adhesion of the polymer concrete to the aluminum plate.

The shrinkage test used in this experiment is a relative test with no absolute values.

When a sample of polymer concrete is restrained on one side, e.g., by aluminum, the sample will warp if it shrinks as it cures.

The measurement of the shrinkage of the samples was done in the following manner.

The panel was set up on its edge. The first two inches of the eighteen inch sample was matched to a straight line or "x" axis. The other end of the sample would either:
(a) be in the first quadrant, indicating shrinkage, and given a plus value. More rubber could be added to this formulation.
(b) be on the "x" axis, indicating "zero" shrinkage and given a "zero" value.
(c) be in the second quadrant, indicating expansion, and given a negative value. This indicated there was too much rubber in this formulation.

The distance above or below the "x" axis measured in 1/32 of an inch for an 18 inch long sample is equal to the tangent of the angle of the triangle formed.

The controls with no rubber gave the shrinkage angle from which the shrinkage of the rubber blends was evaluated.

TABLE I

| EXAMPLE | 1 | 2 | 3 | 4 | 5 | 6 | 7 | 8 | 9 | 10 | 11 |
|---|---|---|---|---|---|---|---|---|---|---|---|
| Resin 1 | 100 | 78 | 80 | 88 | | | | | | | |
| Resin 2 | | | | | 100 | 88 | 92 | 96 | | | |
| Resin 3 | | | | | | | | | 100 | 88 | 92 |
| Resin 4 | | | | | | | | | | | |
| Resin 5 | | | | | | | | | | | |
| Rubber | | | | | | | | | | | |
| 1 | | 22 | | | | | | | | 12 | |
| 2 | | | | | | | | | | | 8 |
| 3 | | | | | | 12 | | | | | |
| 4 | | | | | | | | 4 | | | |
| 5 | | | | 20 | | | | | | | |
| 6 | | | | | | 12 | | 8 | | | |

TABLE I-continued

| 7 | | | | | | | | | | | |
|---|---|---|---|---|---|---|---|---|---|---|---|
| Comp. Strength | 7800 | 5100 | 5300 | 6400 | 8300 | 7100 | 7600 | 8300 | 8000 | 6200 | 5600 |
| % retained C.S. | | 65 | 68 | 82 | | 85 | 91 | 100 | | 78 | 70 |
| % shrinkage | | 0 | 18 | −26 | 66 | 0 | 0 | | 16 | 0 | |
| Shrink Angle | 10.6 | | | | 10.4 | | | | 10.2 | | |

| EXAMPLE | 12 | 13 | 14 | 15 | 16 | 17 | 18 | 19 | 20 | 21 |
|---|---|---|---|---|---|---|---|---|---|---|
| Resin 1 | | | | | | | | | | |
| Resin 2 | | | | | | | | | | |
| Resin 3 | 88 | 90 | 92 | | | | | | | |
| Resin 4 | | | | 100 | 92 | 90 | 88 | | | |
| Resin 5 | | | | | | | | 100 | 92 | 80 |
| Rubber | | | | | | | | | | |
| 1 | | | | | | | | | | |
| 2 | | | | | 8 | | | | | |
| 3 | 12 | | | | | | | | | |
| 4 | | | | | | | | | | |
| 5 | | 10 | | | | 10 | | | | |
| 6 | | | 8 | | | | | | 8 | |
| 7 | | | | | | | 12 | | | 2 |
| Comp. Strength | 7300 | 6200 | 6200 | 6500 | 9900 | 7400 | 7700 | 9800 | 3800 | 6100 |
| % retained C.S. | 71 | 78 | 75 | | 115 | 86 | 89 | | 79 | 127 |
| % shrinkage | −16 | −21 | 19 | | 0 | 0 | 0 | | 62 | 36 |
| Shrink Angle | | | | 9.6 | | | | 8 | | |

What is claimed is:

1. A room temperature low pressure curing moldable polymer concrete composition having improved mechanical properties and dimentional stability when molded, said composition comprising:
   (a) an acetylene terminated polyamide;
   (b) an ethylenically unsaturated monomer;
   (c) a filler;
   (d) a combination of a low temperature free radical initiator and a low temperature promoter which will cure at between 0° C. and 100° C.;
   (e) a styrene-butadiene block copolymer having styrene block molecular weights of between 1,000 and 100,000, butadiene block molecular weights between 30,000 and 100,000 with the butadiene having a microstructure of between about 10 to 90 mole percent 1,2-vinyl, between about 5 and 40 mole percent 1,4-cis and between about 5 and 50 mole percent 1,4-trans.

2. The composition of claim 1 wherein said unsaturated monomer is styrene.

3. The composition of claim 1 wherein said filler is gravel.

4. The composition of claim 1 wherein said filler is a mixture of sand and gravel.

5. The composition of claim 1 wherein the filler is present at between 40% and 96% by weight.

6. The composition of claim 1 wherein the filler is present at between 60% and 90% by weight.

7. The composition of claim 1 wherein said initiator is an organic peroxide.

8. The composition of claim 1 wherein the initiator is methyl ethyl ketone peroxide.

9. The composition of claim 1 wherein the promotor is cobalt naphthate.

10. The composition of claim 1 wherein the initiator-promoter combination cures at between 10° and 60° C.

11. The composition of claim 1 wherein the initiator-promoter combination cures at between 10° and 40° C.

12. The composition of claim 1 wherein the weight average molecular weight of each styrene block in said block copolymer is between about 8,000 and about 20,000 and the weight average molecular weight of each butadiene block in said block copolymer is between about 30,000 and about 100,000.

13. The composition of claim 1 wherein the block copolymer is a tapered styrene/butadiene block copolymer.

* * * * *